United States Patent [19]

Wingard, Jr. et al.

[11] 4,386,206

[45] May 31, 1983

[54] TERTIARY AMIDES AS SOLVENTS IN ANTHRAPYRIDONE SYNTHESES

[75] Inventors: Robert E. Wingard, Jr., Mountain View; Sally A. Swanson, San Jose, both of Calif.

[73] Assignee: Dynapol, Palo Alto, Calif.

[21] Appl. No.: 306,783

[22] Filed: Sep. 29, 1981

[51] Int. Cl.³ .............................................. C09B 5/14
[52] U.S. Cl. ...................................................... 546/76
[58] Field of Search ......................................... 546/76

[56] References Cited

U.S. PATENT DOCUMENTS

| | | | |
|---|---|---|---|
| 3,502,665 | 3/1970 | Wetherill et al. | 544/28 |
| 3,598,831 | 8/1971 | Pfister | 546/76 X |
| 3,926,996 | 12/1975 | Schuhmacher | 548/223 X |
| 4,141,895 | 2/1979 | Middleton | 544/286 X |
| 4,182,885 | 1/1980 | Bunes | 546/76 |
| 4,309,543 | 1/1982 | Keeley | 546/76 |

OTHER PUBLICATIONS

Eilingsfeld, et al., Angew. Chem., vol. 72, No. 22, pp. 836–837 (1960).
Kittala, "Dimethylformamide Chemical Uses", E. I. Du Pont de Nemours & Co., Wilmington, Del. (1967), pp. 42–56.

*Primary Examiner*—Donald G. Daus
*Assistant Examiner*—Diana G. Rivers
*Attorney, Agent, or Firm*—Burns, Doane, Swecker & Mathis

[57] ABSTRACT

Anthrapyridones are prepared in high yields from 1-aminoanthraquinones or 1-alkylaminoanthraquinones and phenylacetyl halides when tertiary amides are employed as reaction media. The phenylacetyl halides can be generated *in situ* from phenylacetic acid and thionyl halide or phosgene.

11 Claims, No Drawings

TERTIARY AMIDES AS SOLVENTS IN ANTHRAPYRIDONE SYNTHESES

BACKGROUND OF THE INVENTION

1. Field of the Invention

This invention is in the field of chemical syntheses and relates in particular to the synthesis of anthrapyridones.

2. The Prior Art

4-Aminoanthrapyridones were first reported as a red chromophore class in 1932 SANDOZ U.S. Pat. No. 1,891,317. These dyes were prepared by an acylational-dol condensation (cyclization) sequence between a 1-amino-4-haloanthraquinone and an acylating agent possessing at least two reactive α-hydrogens (e.g., esters of acetoacetic or malonic acid, or acetic anhydride), followed by displacement of the relatively reactive halogen in Ullmann fashion with an appropriate amine. The harsh reaction conditions (time, temperature, pH) generally employed for the acylation and ring-closure steps of anthrapyridone preparation have resulted in yields that vary dramatically from chromophore to chromophore depending on the nature and sensitivity of the functionality involved.

Other representative older references to anthrapyridones and their syntheses which demonstrate the harsh reaction conditions heretofore employed include: (a) "British Intelligence Objectives Subcommittee Report 1484", Publication Board No. 86139, Library of Congress, Washington, D.C., 1947, p. 46; (b) C. F. H. Allen, J. V. Crawford, R. H. Sprague, E. R. Webster, and C. V. Wilson, *J. Am. Chem. Soc.*, 72, 585 (1950); (c) Brevet D' Invention 827,961 (I.C.I., 1938); (d) British Pat. No. 964,602 (I.C.I., 1964); and (e) German Patentschrift No. 658,114 of I. G. Farben.

More recently, anthrapyridones took on a new interest to us when it was discovered that such groups were especially advantageous as polymeric dye chromophores [See D. J. Dawson, K. M. Otteson, P. C. Wang, and R. E. Wingard, Jr., *Macromolecules*, 11,320 (1978)].

Commonly assigned U.S. Pat. No. 4,182,885 issued on Jan. 8, 1980 to Bunes disclosed a family of red polymeric aminoanthrapyridone dyes having a chromophore of the formula

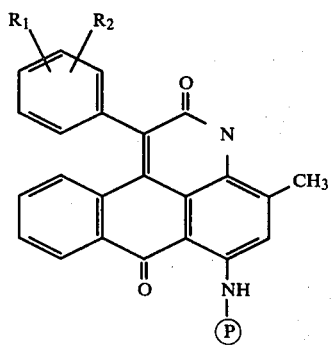

Ⓟ = polymer backbone

These dyes can be prepared by the Ullmann condensation of 3'-phenyl-2-methyl-4-bromoanthrapyridone (6, Br-PAP) or a 3'-phenyl substituted Br-PAP with an amine containing polymer.

Br-PAP can be prepared from 1-amino-2-methyl-4-bromoanthraquinone (4, AMBAX), an intermediate available commercially (SANDOZ), or made from 2-methylanthraquinone (1, 2-MAX), an intermediate also available commercially (BASF). Reaction Scheme I details this possibility.

Scheme I

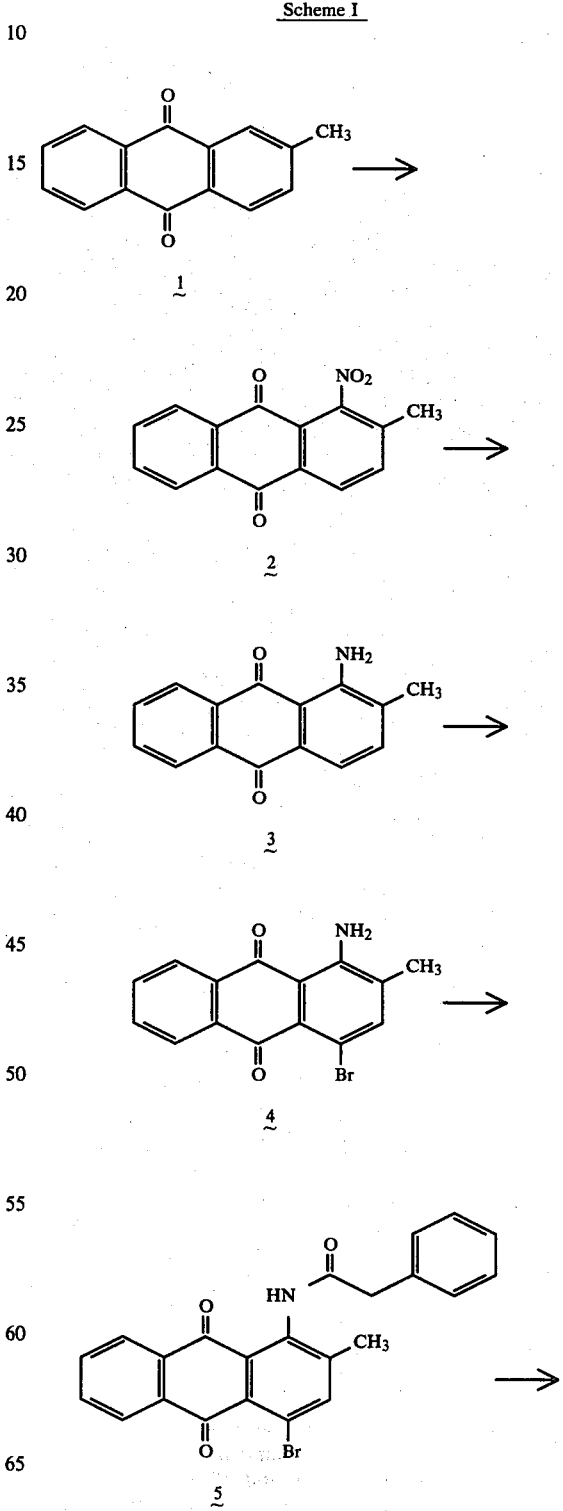

-continued
Scheme I

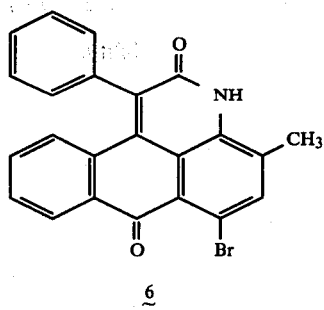

6

In early studies, AMBAX, was acylated with penylacetyl chloride (PhCH$_2$COCl) in toluene or diglyme at reflux to give compound 5 (PAMBAX), which was then with or without isolation cyclized to Br-PAP with refluxing aqueous base. This process had a number of drawbacks. The most important of these were: (a) serious agitation problems were encountered during the cyclization because of reaction heterogeneity; (b) the yield, because of unavoidable side-reactions during the acylation, was apparently limited to about 70%; and (c) plant-scale production runs contained varying amounts of 3'-phenyl-2-methyl-4-chloroanthrapyridone as a contaminant (produced by a proton-catalyzed chloride for bromide exchange during the acylation).

The next phase of Br-PAP work resulted in the discovery that AMBAX and 1.25 equivalents of phenylacetic acid (PhCH$_2$CO$_2$H) could be combined in pyridine (65° C./2 hours) under the aegis of TiCl$_4$ to directly produce Br-PAP in yields of approximately 80%. Although this process was clearly superior to the earlier processes at the bench and, in addition, it substituted the less expensive, less toxic, more stable, and more readily available PhCH$_2$CO$_2$H for PhCH$_2$COCl, it failed for several economic and safety reasons to qualify as an industrially feasible process. It is the subject of U.S. Pat. No. 4,309,543 issued Jan. 5, 1982.

It is therefore an object of this invention to provide an improved chemical process for the manufacture of anthrapyridone materials such as Br-PAP which avoids the harsh reaction conditions and low isolated yields of the prior art processes.

STATEMENT OF THE INVENTION

It has now been found that tertiary amide liquids are especially advantageous solvents for the production of anthrapyridones from anthraquinones. By the process of this invention, a phenylacetyl halide coupling agent, or its substituted equivalent, is reacted with a 1-aminoanthraquinone or a 1-alkylaminoanthraquinone in an acylation reaction using a tertiary amide solvent. The acylation product (amide) is then cyclized with base to give the desired anthrapyridone. The process, which has consistently provided yields in excess of 95%, is conducted through the separate steps of acylation and cyclization without isolation of the intermediate amide. The two steps are readily conducted in a single vessel in 12-15 hours with no heating. The new process requires no expensive raw materials or equipment, can be conducted at 10-20 wt. % product concentration, is homogeneous throughout its course, and offers inexpensive product isolation/purification and solvent recycle. In an economically significant extension of the basic process, it has been found that the PhCH$_2$COCl (or equivalent) for the acylation can be generated in situ by the reaction of PhCH$_2$CO$_2$H or the like with either phosgene (COCl$_2$) or thionyl chloride (SOCl$_2$).

The key to the commercial value of this entire multistep, one-pot process is the use of tertiary amide solvents (N,N-dimethylformamide and N-methyl-2-pyrrolidinone preferred, with the latter most preferred). Tertiary amide solvents enhance and facilitate each step of the process. Tertiary amide solvents react with SOCl$_2$ or COCl$_2$ to produce a Vilsmeier complex [7, see A. Vilsmeier and A. Haack, Chem. Ber., 60B,119 (1927)] which rapidly and quantitatively converts PhCH$_2$CO$_2$H (or equivalent) into PhCH$_2$COCl or the like under extremely mild conditions. In the acylation step, tertiary amide liquids serve not only as excellent solvents for the highly insoluble 1-aminoanthraquinones and 1-alkylaminoanthraquinones, but also greatly increase the ambient temperature (i.e., 20°-40° C.) acylation rate of these very unreactive amines by forming stable activated complexes with the extremely heat-and base-sensitive acid halide (see 8), and by complexing with the acid (HX) generated by the acylation (see 9). Tertiary amide solvents, by virtue of being polar, aprotic, cation-solvating media, enhance the basicity of the anion (hydroxide preferred) used to catalyze pyridone-ring formation, and thereby also improve the rate and yield of this step.

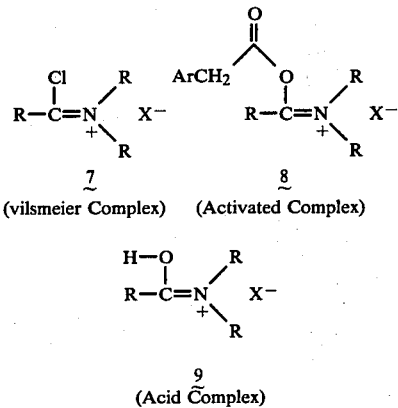

7
(Vilsmeier Complex)

8
(Activated Complex)

9
(Acid Complex)

DETAILED DESCRIPTION OF THE INVENTION

This detailed description contains the following sections: First, the Anthraquinone Reactant is described; Second, the Coupling Agent and methods for in situ generation are depicted, then the Tertiary Amide Solvent, the Cyclization Base and the Reaction Conditions are shown. Finally, examples are presented.

The Anthraquinone Reactant

The anthraquinone reactant is an aminoanthraquinone—particularly a 1-aminoanthraquinone or 1-alkylaminoanthraquinone. Usually, but not necessarily, the anthraquinone contains one or more—e.g., 1 to 4 other substituents such as lower alkyls of 1 to 5 carbons; halides, such as Cl, Br or I, especially Br; hydroxyl groups; nitro groups; sulfonate groups; aryl groups of 6 or greater carbons; tertiary amino groups; and lower alkoxies of 1 to 5 carbons.

Such materials are represented structurally by Formula I.

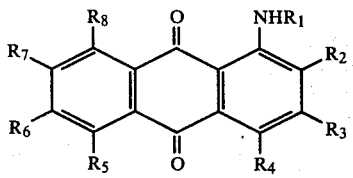

I.

wherein $R_2$ through $R_8$ are hydrogens or the aforedescribed 1 to 4 substituents, and $R_1$ is a hydrogen or a lower alkyl of 1 to 5 carbons.

Representative anthraquinone materials include the materials listed in Table I, wherein each of $R_1$–$R_8$ are hydrogen unless otherwise noted.

TABLE I

| | | | Anthraquinone Reactants | | | | |
|---|---|---|---|---|---|---|---|
| $R_1$ | $R_2$ | $R_3$ | $R_4$ | $R_5$ | $R_6$ | $R_7$ | $R_8$ |
| — | — | — | halo, e.g. (Br, Cl) | — | — | — | — |
| — | lower alkyl (1–5 carbon) | — | — | — | — | — | — |
| — | lower alkyl (1–5 carbon) | — | halo, e.g. (Br, Cl) | — | — | — | — |
| — | methyl | — | Br or Cl | — | — | — | — |
| — | — | — | — | halo | — | — | — |
| — | lower alkyl (1–5 carbon) | — | — | halo | — | — | — |
| lower alkyl (1–5 carbon) | — | — | — | — | — | — | — |
| lower alkyl (1–5 carbon) | — | — | halo, e.g. (Br, Cl) | — | — | — | — |

Because of our special interest in converting it to a polymeric dye, we prefer 1-amino-2-methyl-4-bromoanthraquinone as anthraquinone reactant.

The Coupling Agent

The coupling agent employed has the structure shown in Formula II

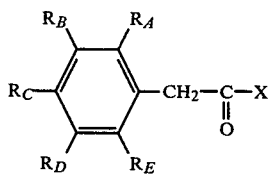

II wherein X is a halo, especially chloro, bromo or iodo and most especially chloro, and $R_A$–$R_E$ are hydrogens or up to two substituents each selected from among halos including fluoro, chloro, bromo, and iodo; nitros; lower alkoxies including methoxy, ethoxy, and propoxy; lower alkyls including methyl, ethyl, and propyl; and sulfonate. Nonhydrogen substituents are preferably positioned as $R_A$, $R_C$ or $R_E$. Preferably, one or none of $R_A$–$R_E$ are other than hydrogen and most preferably $R_A$–through $R_E$ are hydrogens—i.e. the coupling group is phenylacetyl chloride.

These coupling agents can be employed directly or, we have found, can be advantageously generated *in situ* by either of two methods—by reacting thionyl halide (especially chloride) with phenylacetic acid or an $R_A$–$R_E$-substituted phenylacetic acid, or by reacting phosgene with the appropriately substituted phenylacetic acid. These two in situ routes will be demonstrated and described in detail in Examples V and VI. The term "a phenylacetic acid" is intended to encompass both phenylacetic acid itself and substituted phenylacetic acids.

Tertiary Amide Solvents

The tertiary amide solvent employed in this invention may be represented by the formula

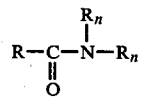

wherein R is hydrogen or a lower alkyl or a cyclic group joined to one of the $R_n$'s and the $R_n$'s are each independently alkyls or one half of a cyclic group made up of 2 $R_n$'s or 1 $R_n$ plus R. These different configurations are shown in Table II.

TABLE II

| TERTIARY AMIDE SOLVENTS | |
|---|---|
| Structure | Representative Members |
| $\begin{array}{c} R_n \\ R-C-N \\ \parallel \quad \backslash \\ O \quad\; R_n \end{array}$<br><br>R = H or alkyl of 1 to 5 carbons. $R_n$'s each equal lower alkyls of 1 to 5 carbons | N,N—dimethylformamide<br>N,N—diethylformamide<br>N,N—dipropylformamide<br>N—methyl-N—ethylformamide<br>N,N—dimethylacetamide<br>N,N—diethylacetamide<br>N,N—dipropylacetamide<br>N—methyl-N—ethylacetamide<br>N,N—dimethylpropionamide |
| $\begin{array}{c} \;\;\;\,{-}R_n \\ \;\;\;\;\,\mid \\ R-C-N-R_n \\ \parallel \\ O \end{array}$<br><br>R and one $R_n$ form a 4 to 8 membered cyclic group. The other $R_n$ is a lower alkyl | N—methyl-2-pyrrolidinone<br>N—ethyl-2-pyrrolidinone<br>N—propyl-2-pyrrolidone<br>N—methyl-2-piperidone<br>N—methyl-ξ-caprolactam |
| $\begin{array}{c} R_n\,\backslash \\ \;\,\mid \;\;\,\backslash \\ R-C-N-R_n \\ \parallel \\ O \end{array}$<br><br>R is a hydrogen or alkyl of 1 to 5 carbons. The two $R_n$'s form a 4 to 8 carbon cyclic group | N—formylpyrrolidine<br>N—acetylpyrrolidine<br>N—formylpiperidine<br>N—acetylpiperidine<br>N—propionylpiperidine<br>N—butylpiperidine<br>N—formylhexamethylenimine<br>N—formylheptamethylenimine |

Of these, special preference is given to N,N-dimethylformamide (DMF); N-methyl-2-pyrrolidinone (NMP); N,N-dimethylacetamide (DMAC); and N-formylpiperidine (NFP), with NMP being a most preferred solvent giving the highest balance of yield and reaction rates.

Cyclization Base

Cyclization of the product of the acylation reaction between the phenylacetyl halide and the anthraquinone is carried out in the presence of base. We have found that while all common alkali metal bases (hydroxides, carbonates, bicarbonates, alkoxides, acetates, etc.) work and can be employed, as can other recognized bases, there is a preference for simple KOH and NaOH. None of the other materials works any better and none offers cost advantages. The base is generally added as a solution. Alkanols (methanol, ethanol) are preferred solvents, but water or water-alkanol mixtures may be used as well. The aqueous solutions are believed to offer some economic advantage.

Reaction Conditions

This conversion involves two reactions—acylation followed by cyclization of the acylated product. The reactions are carried out sequentially—the cyclization being carried out after acylation is complete. Quite obviously, these two reactions can be carried out in two separate batch zones. So too, they can be carried out in two separate continuous "flow" zones—that is the product of the acylation zone 1 can be continuously fed to the cyclization zone 2. We prefer, based on highest yields and conversions, and ease of handling, to operate in a single-pot batch mode wherein the acylation batch is left in the reactor and there treated with base to cyclize. In any case, both reactions are carried out with agitation.

It is a feature of this invention to carry out the acylation and ring-closure reactions under mild conditions. The anthraquinone is contacted with the phenylacetyl halide coupling agent or its equivalent or a precurser in the aforedescribed tertiary amide solvent. The contacting is carried out at low to moderate temperatures such as from 0° to 100° C., preferably 0° to 50°, and especially from 20° C. to 40° C. Ambient temperature gives very good results. As one might expect, higher temperatures give a faster rate of reaction, but also result in decreased yields as the heat-sensitive coupling agent is consumed in side reactions.

The molar ratio of anthraquinone to coupling agent is about 1:1 with slight excesses of coupling agent being generally useful. Ratios of 1:1 to 1:2 are preferred with 1.0:1.1 to 1.0:1.4 and especially about 1.00 to 1.25 being more preferred.

The concentration of the reactants in the tertiary amide solvent should be maximized—smaller reaction volumes are preferred. The concentration of anthraquinone can range from about 3% by weight up to about 20% and preferably is from about 5% by weight to about 15% by weight.

The cyclization is carried out at a temperature of from room temperature (20° C.) to as high as 100° C. or more, preferably from about 30° C. to about 70° C. The reaction time is from about 15 minutes to 4 hours. The amount of base added must be large enough to neutralize all the acid and acid equivalent species either added in excess or generated during the acylation and should provide at least 0.25 equivalent (preferably 0.50 to 1.00 equivalent) of base to insure rapid cyclization.

Recovery of the anthrapyridone products is usually carried out. A simple recovery involves precipitation with acid addition. Acetic acid or other relatively weak acids give good results without harming the anthrapyridone product. Inorganic acids, such as aqueous HCl, may offer some economic advantage. Various other steps, including filtration, dialysis, evaporation and the like may be employed.

The products of this invention have proven utility as dyestuffs and dyestuff intermediates. The disclosure of such utility given in the above-noted patent of Bunes is incorporated by reference.

The invention is further shown by the following non-limiting examples.

EXAMPLE I

Preparation of Br-PAP from PhCH$_2$COCl and AMBAX

Acylation

A 250-ml, 3-neck flask, equipped with overhead stirrer and Ar inlet, was charged with 12.50 g of AMBAX (SANDOZ, lot no. X256689, 88% by assay, 34.8 mmol), 125 ml of NMP (Aldrich Chemical Co., Milwaukee, Wisc., stored over 4 Å molecular sieves), and 7.64 g (49.5 mmol) of redistilled (bp 93-4° C./14 mm) PhCH$_2$COCl (Aldrich Chemical Co.). The slurry was stirred at ambient temperature under Ar and monitored by TLC (CHCL$_3$ elution, AMBAX R$_f$ 0.37, PAMBAX R$_f$ 0.22). After 3.5 hours the dark-brown reaction was completely homogeneous and about 50% complete. After 5.0 hours the reaction was about 70% complete. After 18 hours no AMBAX could be detected by TLC.

Cyclization

The crude mixture was treated in one portion with 3.96 g (98.9 mmol) of NaOH in 40 ml of CH$_3$OH and stirred at room temperature. The reaction vessel became noticably warm (~40° C.). TLC (4% Me$_2$CO in CHCl$_3$ elution, PAMBAX R$_f$ 0.62, Br-PAP R$_f$ 0.18) showed the conversion to be essentially complete after 30 min.

Recovery

The product was precipitated at 60 min by the addition of 5.25 g (98.5 mmol) of HOAc, and the crude mixture transferred to a 500-ml, one-neck flask and magnetically stirred overnight with 375 ml of CH$_3$OH. Filtration and drying (50° C./0.1 mm/24 h) afforded 14.86 g of greenish-yellow solid determined by a combination of analytical techniques to be 95 wt % Br-PAP (14.12 g, 33.9 mmol, 97% of the theoretically possible yield) and 5 wt % salt(s). No other anthraquinoid species were detectable in the product by HPLC or TLC.

EXAMPLE II

This Example demonstrates the use of four different commercially available tertiary amide solvents as effective reaction media for the acylation reaction.

Four acylation experiments were carried out using the feedstocks of Example I and varying the tertiary amide solvent. Table III presents isolated yield date (corrected for product purity) for the preparation of PAMBAX in N,N-dimethylformamide (DMF), N-methyl-2-pyrrolidinone (NMP), N,N-dimethylacetamide (DMAC), and N-formylpiperidine (NFP). These four experiments, identically conducted at a concentration of 5 wt % solids with 1.50 equiv PhCH$_2$COCl at room temperature, proved the value of tertiary amide solvents in this step of the overall conversion, and suggested the superiority of NMP (rate and yield).

TABLE III

| AMBAX to PAMBAX in Tertiary Amide Solvents | | |
|---|---|---|
| EXPERIMENT NUMBER | SOLVENT | APPROXIMATE COMPLETION TIME (hours) | ISOLATED YIELD (%) |
| 1 | DMF | 20 | 82 |
| 2 | DMAC | 40 | 93 |
| 3 | NMP | 20 | 92 |
| 4 | NFP | 70 | 90 |

EXAMPLE III

Twelve cyclization experiments were carried out in NMP or DMF varying the base, time, and temperature. Table IV presents the results of a series of experiments, conducted at 5 wt % solids concentration, in which purified PAMBAX was treated with 10 mol % of an alkaline agent under the conditions of solvent, time, and temperature listed. The isolated yield data reported has been corrected for the purity of the product. The results in the table show that the standard sodium and potassium bases all function effectively in the tertiary amide solvents NMP and DMF.

TABLE IV
PAMBAX to Br—PAP Cyclization

| EXPERIMENT NUMBER | SOLVENT | ALKALINE AGENT | COMPLETION TIME (h) | INTERNAL TEMPERATURE (°C.) | ISOLATED YIELD (%) |
|---|---|---|---|---|---|
| 1 | NMP | NaOAc | 4.0 | 65 | 92 |
| 2 | DMF | NaOAc | 2.5 | 70 | 81 |
| 3 | NMP | KOAc | 2.5 | 65 | 91 |
| 4 | DMF | KOAc | 2.5 | 70 | 93 |
| 5 | NMP | NaHCO$_3$ | 16.0 | 65 | 89 |
| 6 | DMF | NaHCO$_3$ | 6.0 | 70 | 95 |
| 7 | DMF | KHCO$_3$ | 5.0 | 70 | 81 |
| 8 | NMP | Na$_2$CO$_3$ | 2.0 | 100 | 92 |
| 9 | DMF | Na$_2$CO$_3$ | 10.0 | 50 | 94 |
| 10 | NMP | K$_2$CO$_3$ | 2.0 | 65 | 83 |
| 11 | DMF | K$_2$CO$_3$ | 2.5 | 70 | 87 |
| 12 | NMP | KOH | 4.0 | RT | 93 |

EXAMPLE IV

A series of twelve "one-pot" sequential acylations and cyclizations, based on AMBAX and phenylacetyl chloride, were carried out using two tertiary amide solvents and various bases. These experiments are summarized in Table V. The yield data is corrected for product purity.

TABLE V
AMBAX to Br—PAP in One-Pot

| EXPERIMENT NUMBER | SOLVENT | BASE | MOLAR RATIO OF BASE TO AMBAX | TIME (h) | TEMP (°C.) | ISOLATED YIELD (%) |
|---|---|---|---|---|---|---|
| 1 | NMP | Me$_4$NOH | 2.50 | 1.0 | RT | 95 |
| 2 | DMF | KOH | 2.50 | 1.0 | RT | 85 |
| 3 | NMP | KOH | 2.50 | 1.0 | RT | 98 |
| 4 | DMF | NaOH | 2.50 | 1.0 | RT | 86 |
| 5 | NMP | NaOH | 2.50 | 1.0 | RT | 97 |
| 6 | DMF | NaHCO$_3$ | 2.50 | 4.0 | 70 | 65 |
| 7 | NMP | NaHCO$_3$ | 2.50 | 0.75 | 100 | 92 |
| 8 | DMF | Na$_2$CO$_3$ | 1.50 | 3.5 | 70 | 60 |
| 9 | NMF | Na$_2$CO$_3$ | 1.50 | no reaction at up to 135° C. | | |
| 10 | NMP | Me$_4$NOAc | 0.50 | 4.5 | 65 | 88 |
| 11 | NMP | KOAc | 1.00 | 24 | 70 | 94 |
| 12 | NMP | NaOAc | 1.00 | 24 | 70 | 91 |

In these experiments, the acylations were identically conducted (room temperature, 18 hours) with 1.25 equiv PhCH$_2$COCl at approximately 10% wt solids. Time and temperature data in the table refer to the ring-closure step. 1.50 equiv of hydroxide (relative to AMBAX) is necessary to neutralize the HCl and excess acid chloride present after the acylation. In experiments 10 through 12, the HCl and excess PhCH$_2$COCl were neutralized by 1.50 equiv of hydroxide prior to the addition of the indicated amount of acetate.

The table shows that a variety of the solvent-base combinations that were tested worked well, although, in general, the effectiveness of the carbonates, bicarbonates, and acetates was decreased because of reductions in solubility caused by the greater ionic strengths of the media. The simple alkali metal hydroxides were found to function extremely well in this system (entries 2–5), and offer the method of choice.

At a solids concentration of about 10 wt %, the sequence proceeded effortlessly and was homogeneous from the time the AMBAX dissolves until the base was quenched. A single experiment in NMP at approximately 20 wt % solids concentration went equally well, with the ring-closure step again being homogeneous, although at this concentration the NMP.HCl generated by the acylation had partially precipitated before base addition.

EXAMPLE V
Preparation of Br-PAP from SOCl$_2$, PhCH$_2$CO$_2$H, and AMBAX

The substitution of PhCH$_2$CO$_2$H for PhCH$_2$COCl in a Br-PAP process is advantageous for both economic and safety reasons. The in situ production of PhCH$_2$COCl from PhCH$_2$CO$_2$H and thionyl chloride (SOCl$_2$) and its use in the Br-PAP process is outlined in Scheme II.

Scheme II

This is exemplified by the following:
Generation of Phenylacetyl Chloride
A 500-ml, 3-neck flask, equipped with overhead stirrer, Ar inlet, and thermometer, was charged with 13.46 g (98.9 mmol) of PhCH$_2$CO$_2$H (Aldrich Chemical Co., 98.5%) and 187.5 ml of NMP. The mixture was stirred until homogeneous (~ 30 sec) and treated in one portion with 11.77 g (98.9 mmol) of SOCl$_2$ (Aldrich Chemical Co., 97%). The temperature immediately rose to 36° C. and then slowly dropped to ambient. The color of the reaction mixture turned from clear to yellow to brown.

Acylation
The solution, after stirring 45 min, was treated with 25.00 g of AMBAX (88% by assay, 69.6 mmol) and stirred at room temperature under Ar. The reaction was homogeneous after 3.0 hours, and was 90% complete (TLC analysis) after 5.5 hours. No AMBAX could be detected after approximately 18 hours of stirring.

Cyclization
With magnetic stirring, 31.11 g of 89% KOH (27.69 g, 494 mmol) was dissolved in 80 ml of CH$_3$OH. This alkali was added in one portion with continued stirring at room temperature to the crude PAMBAX solution. The temperature immediately rose to 70° C. TLC showed the conversion to be essentially complete after 15 minutes.

Recovery

After stirring 30 min, the reaction was quenched with HOAc (10.50 g, 175 mmol), stirred one hour, filtered, washed first with a small amount of $CH_3OH$ and then 500 ml of hot (80° C.) $H_2O$, and dried (50° C./0.1 mm/18 h) to afford 30.20 g of product. Assay determined the product to be 92% Br-PAP (27.78 g, 66.8 mmol, 96% of the theoretically possible yield) and 8 wt % salt(s). No anthraquinone impurities could be detected by TLC.

This general procedure was repeated five times varying the cyclization conditions. All acylations were conducted in NMP at room temperature by combining 1.25 equiv each of $SOCl_2$ and $PhCH_2CO_2H$, stirring one hour, adding 1.00 equiv AMBAX, and stirring 18 hours. All cyclizations were conducted by adding a saturated methanolic solution of the indicated base (6.25 equiv) at room temperature and stirring for the indicated time. The results are in Table VI. The yield data reported is corrected for product assay. The weight percent column refers to the theoretical weight percent product in the reaction solution before the acid quench.

TABLE IV

Br—PAP by the In Situ Generation of $PhCH_2COCl$ with Thionyl Chloride

| EXPERIMENT NUMBER | BASE | THEORETICAL WT % Br—PAP (%) | TIME (min) | PRODUCT ASSAY (%) | ISOLATED Br—PAP YIELD (%) |
|---|---|---|---|---|---|
| 1 | KOH | 7.90 | 45 | 95 | 89 |
| 2 | KOH | 9.78 | 30 | 94 | 96 |
| 3 | KOH | 12.06 | 15 | 95 | 96 |
| 4 | NaOH | 8.12 | 60 | 92 | 86 |
| 5 | $NaOCH_3$ | 7.90 | 45 | 94 | 90 |

The 1:1 mole ratio of $SOCl_2$ to $PhCH_2CO_2H$ can be raised to 1.25:1.00 or more, but not lowered below 1:1. Similarly, $R_a$–$R_e$ substituted phenylacetic acids can be employed. The phenylacetyl halide can be a bromide or the like, if desired. Similarly, the reaction temperature can range from 0° C. to 60° or 70° C. Reaction time can be varied, as well, from a few minutes to several hours.

Under the reaction conditions employed for the studies of Table VI, relatively large amounts of base are required to neutralize the acid/acid equivalent species ($SO_2$,HCl,RCOCl) present prior to cyclization. At a stoiciometry ratio of 1.25:1.25:1.00 for $SOCl_2$ to $PhCH_2CO_2H$ to AMBAX, 5.25 equivalents of hydroxide are required for neutralization. At least 0.25 equivalent of base in excess of that needed for neutralization is believed required for efficient cyclization, with 0.50 to 1.00 equivalent being preferred. Temperatures of from 20° C. to 100° C. may be employed, although temperatures of from about 30° C. to about 70° C. are preferred. At very low temperatures the cyclization is sluggish, while at excessively high temperatures side reactions (such as solvent hydrolysis) lower the yield and purity of the desired product.

EXAMPLE VI

Preparation of Br-PAP from $COCl_2$, $PhCH_2CO_2H$, and AMBAX

Generation of Phenylacetyl Chloride

A 500-ml, 3-neck flask, equipped with overhead stirrer, thermometer, ice bath, and 125-ml dropping funnel containing 13.50 g (99.16 mmol) of $PhCH_2CO_2H$ in 50 ml of NMP and topped with an Ar inlet, was charged with an ice-cold solution of 10.08 g (101.8 mmol) of $COCl_2$ (Union Carbide, New York, N.Y.) in 10 ml of toluene. The $PhCH_2CO_2H$ solution was added dropwise over 30 min ($CO_2$ was vigorously evolved during the addition of the first 10 ml), and the dropping funnel was rinsed with an additional 50 ml of NMP. The homogeneous amber-colored mixture was then stirred 90 min at ambient temperature.

Acylation

The solution was treated with 25.00 g of AMBAX (88% assay, 69.6 mmol) with a further 50 ml of NMP being used for washing, and stirred at room temperature under Ar. The reaction was homogeneous after 7.0 hours and conversion to PAMBAX was complete (TLC analysis) after 18 hours. At the 18 hour point a light precipitate (presumably NMP.HCl) was present.

Cyclization

With magnetic stirring, 19.10 g of 89% KOH (17.00 g, 204 mmol) was dissolved in 45 ml of $CH_3OH$. The alkali was added in one portion with continued stirring at room temperature to the crude PAMBAX solution. The temperature immediately rose to 63° C. TLC showed the conversion to be essentially complete after 15 min.

Recovery

After stirring 30 min, the reaction was quenched with HOAc (10.50 g, 175 mmol), stirred one hour, filtered, washed first with a small amount of $CH_3OH$ and then with 500 ml of hot (80° C.) $H_2O$, and dried (50° C./0.1 mm/24 h) to afford 29.20 g of product assayed at 93% Br-PAP (27.16 g, 65.3 mmol, 94% of the theoretically possible yield) and 7 wt % salt(s). No anthraquinone impurities could be detected by TLC.

This generation of phenylacetyl chloride could be modified as set out in the generation of phenylacetyl chloride of Example V.

The use of $COCl_2$ in place of $SOCl_2$ for $PhCH_2COCl$ generation is advantageous with respect to the amount of base needed for neutralization and the amount of various inorganic salts that must be separated from the product. This is because the co-product of the $COCl_2$ reaction ($CO_2$) is evolved from the liquid reaction medium and can be expelled from the reaction zone, while the co-product of the $SOCl_2$ reaction ($SO_2$) remains in the reaction medium and requires neutralization. This is demonstrated by the following two equations which show the overall reaction for a one-pot $PHCH_2CO_2H \rightarrow PhCH_2COCl \rightarrow PAMBAX \rightarrow Br$-PAP conversion from both $SOCl_2$ and $COCl_2$. Both equations assume 1.00:1.25:1.25 stoiciometry for AMBAX to $PhCH_2CO_2H$ to $SOCl_2/COCl_2$.

$SOCl_2$ Case

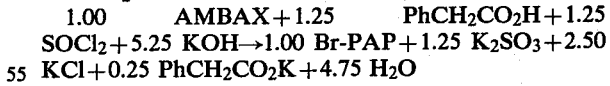

$COCl_2$ Case

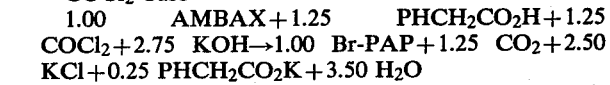

The in situ generation of $PhCH_2COCl$ from $COCl_2$ followed by conversion to Br-PAP was repeated 5 times (Table VII). All acylations were conducted by combining 1.25 equiv $PhCH_2CO_2H$ and 1.25-1.38 equiv $COCl_2$ (as a toluene solution) with NMP at 0° C., allowing the mixture to warm and stir one hour at room temperature, adding 1.00 equiv AMBAX, and stirring 18 hours. All cyclizations were conducted by adding a saturated methanolic solution of the indicated amount of KOH at room temperature and stirring for 30 min. In most cases the internal temperature rose to about 55° C. The yield data reported is corrected for product assay.

TABLE VII
Br—PAP by the In Situ Generation of PhCH$_2$COCl with Phosgene

| EXPERIMENT NUMBER | EQUIV KOH Total/Available for cyclization | THEORETICAL WT % Br—PAP (%) | PRODUCT ASSAY (%) | ISOLATED Br—PAP YIELD (%) |
|---|---|---|---|---|
| 1 | 3.75/0.88 | 9.10 | 87 | 85 |
| 2 | 3.93/1.00 | 9.81 | 97 | 93 |
| 3 | 4.00/1.00 | 9.88 | 92 | 85 |
| 4 | 3.75/1.00 | 10.62 | 93 | 93 |
| 5 | 3.93/1.00 | 14.73 | 96 | 96 |

EXAMPLE VII

Example I is repeated four times with the following modifications:
Run 1—4-chlorophenylacetyl chloride is the coupling agent
Run 2—4-sulfophenylacetyl chloride is the coupling agent
Run 3—4-methoxyphenylacetyl chloride is the coupling agent
Run 4—2,4-dimethylphenylacetyl chloride is the coupling agent

EXAMPLE VIII

Example I is repeated with the following modifications:
Run 1—1-aminoanthraquinone is the anthraquinone
Run 2—1-amino-4-chloroanthraquinone is the anthraquinone
Run 3—1-amino-2,6-dimethyl-4-chloroanthraquinone is the anthraquinone
Run 4—1-methylaminoanthraquinone is the anthraquinone
Run 5—1-methylamino-4-bromoanthraquinone is the anthraquinone

EXAMPLE IX

Preparation of 3'-(4-methoxyphenyl)-1'-methyl-4-bromoanthrpyridone from SOCl$_2$, 4-methoxyphenylacetic acid, and 1-methylamino-4-bromoanthraquinone.

Generation of 4-Methoxyphenylacetyl Chloride

A 2000-ml, 3-neck flask, equipped with overhead stirrer, Ar inlet, and 125-ml dropping funnel containing 53.5 g (0.54 mol) of NMP, was charged with 897 g (5.40 mol) of 4-methoxyphenylacetic acid (Aldrich) and 675 g (5.67 mol) of SOCl$_2$. With stirring, the NMP was added dropwise over one hour (vigorous gas evolution), and the mixture then heated in a 40° C. bath until gas evolution ceased (approximately 2 hours). The system was gradually evacuated until a vacuum of roughly 20 mm Hg was obtained, and degassing was continued until the clear, yellow liquid stopped bubbling (30 min).

Acylation

A 22-liter, 3-neck reaction kettle, fitted with overhead stirrer, thermowell, and Ar inlet, was charged with 1374 g of 1-methylamino-4-bromoanthraquinone [prepared by the method of C. V. Wilson, Org.Synth., 29,68 (1949) and assayed at 92%, 4.00 mol] and 9500 ml of NMP. The 4-methoxyphenylacetyl chloride prepared above was added in one portion (exotherm from 22° C. to 30° C.), and the mixture stirred at room temperature under Ar for 18 hours, at which point TLC analysis (CHCl$_3$ elution) indicated the reaction to be complete.

Cyclization

A solution of 831 g of 86% KOH (715 g, 12.8 mol) in 1000 ml H$_2$O was added over one minute with vigorous stirring. The internal reaction temperature rose over 5 minutes to 64° C., and then slowly returned to ambient.

Recovery

After 90 minutes, the reaction was quenched by the rapid addition of 750 ml (9.00 mol) of 12 N aqueous HCl (temperature to 50° C.). After stirring for an additional 120 minutes, the product was filtered on three 3000-ml filter funnels, and each product portion washed successively with CH$_3$OH (1×2000 ml), H$_2$O at 85° C. (3×2000 ml), and CH$_3$OH (1×2000 ml). The product was dried (50° C./1.0 mm/48 h) to afford 1619 g of greenish-yellow solid which assayed at 97 weight percent anthrapyridone (1570 g, 3.52 mol, 88% of the theoretically possible yield).

What is claimed is:

1. The process for preparing an anthrapyridone which comprises contacting under acylation reaction conditions in a tertiary amide solvent, a 1-aminoanthraquinone or 1-alkylaminoanthraquinone with a phenylacetyl halide to form an acylation product, and thereafter without isolation contacting said acylation product in said tertiary amide solvent with alkali metal base at a temperature of 20° C. to 100° C. with agitation.

2. The process of claim 1 wherein said reaction conditions include an acylation temperature of from 0° to 100° C.

3. The process of claim 2 wherein said tertiary amide solvent is selected from among N,N-dimethylformamide, N-methyl-2-pyrrolidinone, N,N-dimethylacetamide, and N-formylpiperidine.

4. The process of claim 3 wherein the molar ratio of phenylacetyl halide to aminoanthraquinone or alkylaminoanthraquinone is from 1:1 to 2:1.

5. The process of claim 4 wherein said alkali metal base is KOH or NaOH.

6. The process of claim 4 wherein the tertiary amide solvent is selected from N-methyl-2-pyrrolidinone and N,N-dimethylformamide and said acylation temperature is from 0° C. to 50° C.

7. The process of claim 4 wherein the tertiary amide solvent is N-methyl-2-pyrrolidinone.

8. The process of claim 7 wherein said alkali metal base is KOH or NaOH.

9. The process of claim 8 wherein said phenylacetyl halide is phenylacetyl chloride and said aminoanthraquinone is 1-amino-2-methyl-4-bromoanthraquinone.

10. The process of claim 1 wherein said phenylacetyl halide is generated in situ from a phenylacetic acid and sulfonyl chloride.

11. The process of claim 1 wherein said phenylacetyl halide is generated in situ from a phenylacetic acid and phosgene.

* * * * *